(12) United States Patent
Schroeder

(10) Patent No.: US 9,254,963 B2
(45) Date of Patent: Feb. 9, 2016

(54) TUBE CONVEYOR CLEAT DESIGN

(71) Applicant: WCCO Belting, Inc., Wahpeton, ND (US)

(72) Inventor: Michael Schroeder, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 0 days.

(21) Appl. No.: 14/678,497

(22) Filed: Apr. 3, 2015

(65) Prior Publication Data

US 2015/0284185 A1    Oct. 8, 2015

Related U.S. Application Data

(60) Provisional application No. 61/974,631, filed on Apr. 3, 2014.

(51) Int. Cl.
*B65G 15/44* (2006.01)
*B65G 15/08* (2006.01)
*B65G 15/40* (2006.01)

(52) U.S. Cl.
CPC ............... *B65G 15/44* (2013.01); *B65G 15/08* (2013.01); *B65G 15/40* (2013.01)

(58) Field of Classification Search
CPC ........ B65G 15/08; B65G 15/40; B65G 15/42; B65G 15/44
See application file for complete search history.

(56) References Cited

U.S. PATENT DOCUMENTS

| | | | |
|---|---|---|---|
| 3,603,450 A * | 9/1971 | Chamberlain | B65G 15/44 198/699.1 |
| 6,170,646 B1 | 1/2001 | Kaeb | |
| 6,360,878 B1 | 3/2002 | Deal | |
| 7,690,499 B2 * | 4/2010 | Smith | B65G 15/08 198/690.2 |
| 8,292,065 B1 | 10/2012 | Neufeld | |
| 2002/0139643 A1 * | 10/2002 | Peltier | B65G 15/08 198/821 |
| 2005/0217973 A1 | 10/2005 | Bjorklund | |
| 2010/0326798 A1 | 12/2010 | Friesen | |

OTHER PUBLICATIONS

Notification of Transmittal of The International Search Report and Written Opinion of the International Searching Authority(PCT/US2015/024302) dated Jul. 2, 2015—12 pages.

* cited by examiner

*Primary Examiner* — Leslie A Nicholson, III
*Assistant Examiner* — Keith R Campbell
(74) *Attorney, Agent, or Firm* — Moss & Barnett

(57) ABSTRACT

A tube conveyor belt system for use in conjunction with a support. At least a portion of the support has a concave shape. The tube conveyor belt system has a belt and at least one cleat. The belt has a surface. The at least one cleat extends from the surface of the belt. The at least one cleat includes a plurality of paddle regions and a plurality of web regions. The plurality of paddle regions is in a spaced-apart configuration. The web regions have a flexibility that is greater than a flexibility of the paddle regions. One of the web regions is positioned between adjacent paddle regions.

17 Claims, 2 Drawing Sheets

TUBE CONVEYOR CLEAT DESIGN

REFERENCE TO RELATED APPLICATION

This application claims priority to U.S. Provisional Application No. 61/974,631, which was filed on Apr. 3, 2014, the contents of each of which are incorporated herein by reference.

FIELD OF THE INVENTION

The invention relates generally to conveyor belts. More particularly, the invention relates to a cleat for conveyor belts that enables the conveyor belts to be used for moving product in flat and curved belt configurations.

BACKGROUND OF THE INVENTION

Because of their ability to move large amounts of material, conveyor belts have been long been used in industry such as for moving agricultural products, rocks and other mined materials and various manufactured products.

In many situations, the conveyor belts include a plurality of cleats that extend from the surface thereof in a spaced-apart configuration. The cleats enhance the amount of product that can be moved using the conveyor belt as compared to configurations that do not include cleats.

One area in which conveyor belts are extensively used is equipment for moving agricultural products because the conveyor belts minimize the potential damage to the agricultural products. In certain situations, it is desired for the conveyor belt to have a flat cross-section configuration.

In other situations, it is desired for the conveyor belt to pass through a cylindrical tube where the conveyor belt would have a curved cross-section configuration. One area in which it is desired to convey product using a cylindrical tube is with relatively light grains or other materials that are susceptible to being blown off of a conveyor having a flat cross-section configuration.

The rigidity of conventional cleats can present challenges associated with moving conveyor belts between flat and curved configurations. Various attempts have been made to increase the ability of the conveyor belts to move between the flat and curved configurations such as by forming the cleats in a plurality of sections.

Kaeb et al., U.S. Pat. No. 6,170,646, discloses forming the conveyor belt cleats in a plurality of sections. Sides of the cleat sections are angled so that when the conveyor belt is moved to the curved configuration, the sides on adjacent cleats are adjacent to each other. Kaeb also discloses a cleat configuration where the adjacent cleats partially overlap each other when in the curved configuration.

Friesen, U.S. Patent Publication No. 2010/0326798, discloses a conveyor belt that is used in conjunction with a tube. The cleats are mounted in two row sets. Each row includes cleat sections mounted in a spaced-apart configuration. The cleat sections in the adjacent rows are offset from each other.

Neufeld et al., U.S. Pat. No. 8,292,665, discloses a conveyor belt that is used in conjunction with a tube. Each of the cleats includes a plurality of cleat sections. The cleats are attached to the conveyor belt in a herringbone pattern so that the cleats are oriented at an angle with respect to the direction in which the conveyor belt moves.

SUMMARY OF THE INVENTION

An embodiment of the invention is directed to a tube conveyor belt system for use in conjunction with a support. At least a portion of the support has a concave shape. The tube conveyor belt system includes a belt and at least one cleat. The belt has a surface. The at least one cleat extends from the surface of the belt.

The at least one cleat includes a plurality of paddle regions and a plurality of web regions. The plurality of paddle regions is in a spaced-apart configuration. The web regions have a flexibility that is greater than a flexibility of the paddle regions. One of the web regions is positioned between adjacent paddle regions.

Another embodiment of the invention is directed to a conveyor belt cleat that includes a plurality of paddle regions and a plurality of web regions. The plurality of paddle regions is in a spaced-apart configuration. The web regions have a flexibility that is greater than a flexibility of the paddle regions. One of the web regions is positioned between adjacent paddle regions.

Another embodiment of the invention is directed to a method of using a tube conveyor belt system that includes a support. At least a portion of the support has a concave shape. A conveyor belt is provided that includes a belt and at least one cleat. The belt has a surface. The at least one cleat extends from the surface of the belt. The cleat includes a plurality of paddle regions and a plurality of web regions. The plurality of paddle regions is in a spaced-apart configuration. One of the web regions is positioned between adjacent paddle regions. The web regions have a flexibility that is greater than a flexibility of the paddle regions.

The at least one cleat is moved to a curved profile when the at least one cleat is over the portion of the support having the concave shape. When the cleat is in the curved profile, the paddle regions on opposite sides of one of the web regions do not engage each other.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 2:
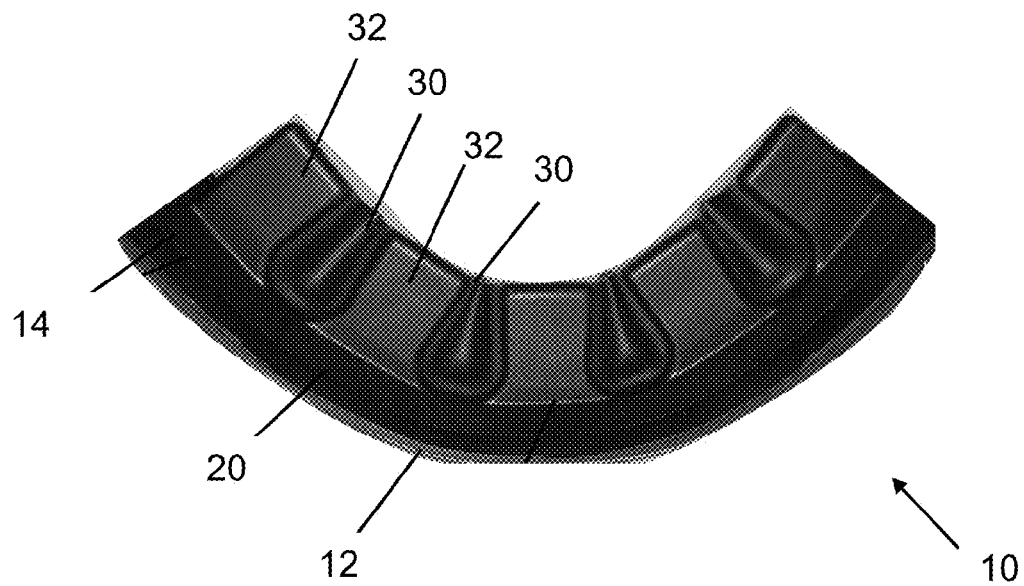
FIG. 2 is a side view of the tube conveyor cleat design where the belt and cleat are in a curved configuration.
Figure 3:
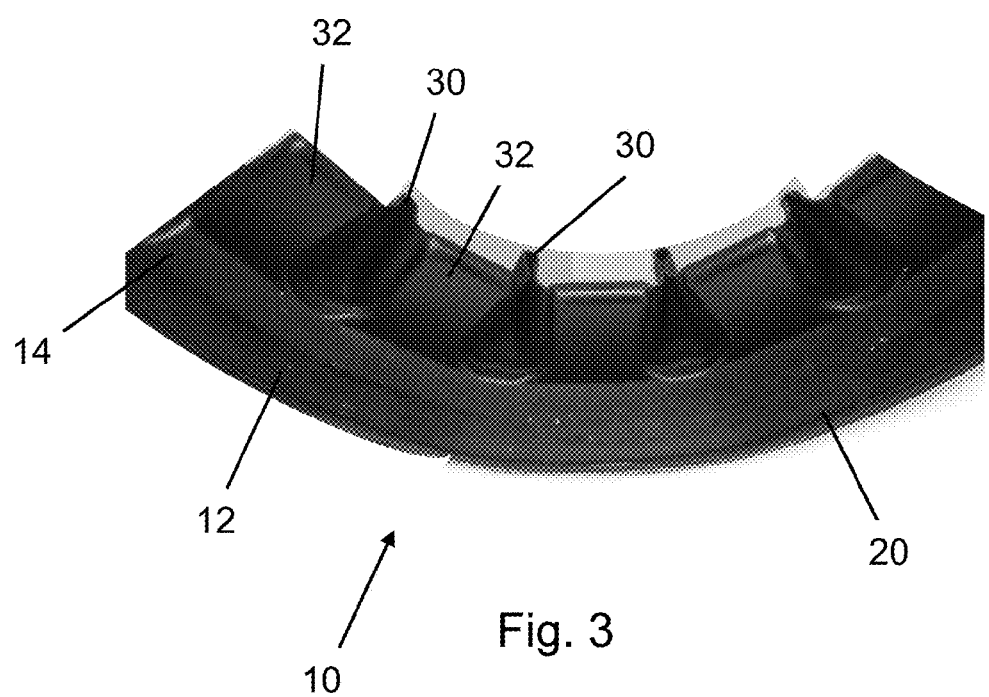
FIG. 3 is a perspective view of the tube conveyor cleat design where the belt and cleat are in the curved configuration.

An embodiment of the invention is directed to a conveyor belt assembly 10 that includes a belt 12 and a plurality of cleats 14 that extend therefrom, as illustrated in the figures. The conveyor belt assembly 10 may be used in conjunction with a conveyor system (not shown) to move objects from one location to another location. The conveyor system can have a flat profile (FIG. 1), a curved profile (FIGS. 2 and 3) or include multiple sections that incorporate the flat profile (FIG. 1) and the curved profile (FIGS. 2 and 3).

The belt 12 may have a variety of configurations when used in conjunction with this invention. In certain embodiments, the belt 12 is relatively flat such that the belt 12 has a thickness that is considerably smaller than a length and a width of the belt 12.

The belt 12 may be fabricated from a variety of materials using the concepts of the invention depending on the material with which the conveyor system is used to convey. In certain embodiments, the belt 12 is fabricated from a fabric base that is coated with at least one layer of rubber using techniques that are known to persons of skill in the art.

Examples of the factors that affect a width of the belt 12 include the type and volume of material that is to be moved on the conveyor belt assembly 10. In certain embodiments, the width of the belt 12 is between about 6 inches and about 48 inches.

The belt 12 may be formed with a thickness depending on factors such as the type and volume of material that is to be moved on the conveyor belt assembly 10. While forming the belt 12 with a greater thickness increases the strength of the conveyor belt assembly 10, it also increases the weight of the belt 12, which necessitates supports for the conveyor belt assembly 10 to be stronger and a motor used to move the conveyor belt assembly 10 to be stronger.

The cleats are provided in a spaced-apart configuration on the belt 12. The spacing between the cleats 14 depends upon factors such as the type of material that is to be moved on the conveyor belt assembly 10. In certain embodiments, the spacing between the cleats is between about 2 inches and about 24 inches. In certain embodiments, a spacing between each of the adjacent cleats 14 may be approximately equal.

In certain embodiments, a process used to fabricate the cleats 14 causes the cleats 14 to be attached to the belt 12. In other embodiments, the cleats 14 are formed separate from the belt 12 and then attached to the belt 12 during the manufacturing process. For example, the cleats 14 may be vulcanized directly to the belt 12 or attached to the belt 12 using an adhesive.

The cleats 14 extend from a surface of the belt 12. In certain embodiments, the cleats 14 may be oriented generally transverse to the belt 12. In other embodiments, the cleats 14 may be oriented at an angle with respect to the belt 12.

A height of the cleat 14 may be selected based upon factors such as the type and volume of material that is to be moved on the conveyor belt assembly 10. In certain embodiments, the height of cleats 14 is between about ½ of an inch and about 6 inches. While it is illustrated that the cleats 14 are all formed with the same height, it is also possible for the cleats 14 are formed with different heights.

In certain embodiments, the cleats 14 may be formed with a thickness that is sufficiently large so that at least a portion of the cleats 14 resists deformation. As used herein, the term thickness means a distance between the leading and trailing surfaces of the cleat 14 when viewed from the direction in which the conveyor belt assembly 10 is typically moved. The thickness of the cleats 14 may be between about ¼ of an inch and about 2 inches.

It may be desirable for the thickness of the cleats 14 to be slightly narrower proximate the distal end thereof to facilitate the manufacturing process such as removing the conveyor belt assembly 10 from a mold that is used to fabricate the cleats 14 and attach the cleats 14 to the belt 12.

The cleats 14 may be formed with a base 20 that is wider than a thickness of the other portions of the cleats 14. Using such a configuration may not only enhance a strength of the attachment of the cleat 14 to the base 12 but may also enhance a rigidity of the cleat 14. The wider base 20 may also reduce wear on the side of the belt 12 that is opposite the cleats 14.

When moving between opposite sides of each cleat 14, the cleat 14 includes a plurality of web regions 30 and a plurality of paddle regions 32. The web regions 30 are located between the paddle regions 32. The paddle regions 32 that have a thickness that is greater than the web regions 30. The paddle regions 32 are thereby relatively rigid while the web regions 30 are relatively flexible.

While decreasing the thickness of the web regions 30 increases the flexibility, the decreased thickness can potentially reduce the strength of the web regions 30. In certain embodiments, the web regions 30 have a thickness of between about 30 and 60 thousandths of an inch.

A width of the web regions 30 is selected based upon a curvature of a tube in which it is desired to use the conveyor belt assembly 10. The web region width should be sufficiently large such that when the conveyor belt assembly 10 is in the tube, that the adjacent paddle regions 32 do not contact each other. In certain embodiments, the tube has a diameter of between about 6 inches and about 36 inches. In other embodiments, the tube has a diameter of between about 10 inches and about 12 inches. While it is illustrated that each of the web regions 30 has a similar width, it is possible to fabricate the web regions 30 with different widths.

The web regions 30 may be positioned intermediate the leading and trailing surfaces of the cleats 14. In other embodiments, the web regions 30 may be positioned proximate the trailing surfaces of the cleats 14.

Figure 1:
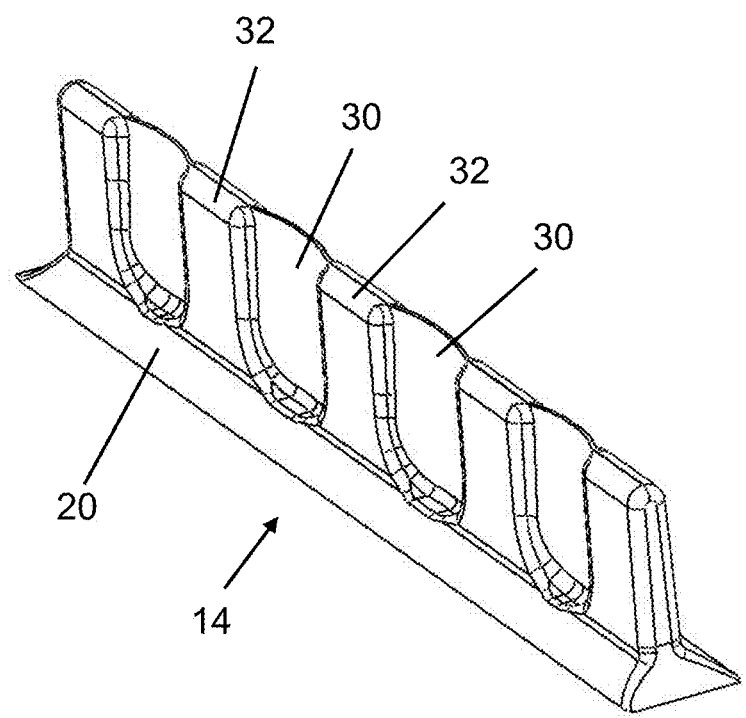
FIG. 1 is a perspective view of a tube conveyor cleat design according to an embodiment of the invention where the cleat is in a flat configuration.

The web regions 30 may be formed with a convex profile as illustrated in FIG. 1. Forming the web regions 30 with the convex profile facilitates directional flexing of the web regions 30 in the downstream direction. It is also possible to fabricate the web regions 30 to facilitate flexing in an upstream direction.

A border between the web regions 30 and the paddle region 32 may be curved as illustrated in FIG. 1. Using such a configuration provides support for the belt 12 and reduces wear on the side of the belt 12 that is opposite the cleats 14.

While it is illustrated that the sides of the paddle region 32 proximate the intersection with the web region 30 are oriented substantially transverse to the belt 12, it is possible for alternate configurations to be used. For example, the paddle region 32 may become narrower when moving towards the distal end of the cleats 14.

The width of the paddle regions 32 can be decreased from what is illustrated in the figures. One limiting criteria in selecting the width of the paddle regions 32 is that the paddle regions 32 have sufficient strength to substantially resist deformation when the conveyor belt system 10 is used to move product. For example, if the paddle regions 32 are fabricated from a relatively rigid material and/or include a reinforcing member, the width of the paddle regions 32 may be relatively small.

An advantage of making the paddle regions 32 relatively narrow is reduced pressure points on the back side of the belt 12 when the conveyor belt assembly 10 is used to convey products and such reduced pressure points can enhance the useful life of the conveyor belt assembly 10 and/or enable the conveyor belt assembly 10 to be fabricated from lighter weight materials.

In certain embodiments, the paddle regions 32 and the web regions 30 are both fabricated from a molded polymeric material. The greater thickness of the paddle regions 32 provides the paddle regions 32 with greater rigidity than the web regions 30.

In certain embodiments, at least one of the paddle regions 32 and the web regions 30 include a reinforcing material therein that increases the durability of the web regions 30 when the cleats 14 are moved between the flat configuration and the curved configuration. A person of skill in the art will appreciate that a variety of relatively flat materials can be used for the reinforcing material. An example of one such reinforcing material is a fabric.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A tube conveyor belt system for use in conjunction with a support, wherein at least a portion of the support has a concave shape, wherein the tube conveyor belt system comprises:
   a belt having a surface; and
   at least one cleat that extends from the surface of the belt, wherein the at least one cleat comprises:
      a plurality of paddle regions in a spaced-apart configuration; and
      a plurality of web regions that have a flexibility that is greater than a flexibility of the paddle regions, wherein one of the web regions is positioned between adjacent paddle regions, wherein the belt comprises a leading end and a trailing end and wherein the when the belt is in a flat configuration, the web regions have a convex shape that is oriented towards the trailing end.

2. The tube conveyor belt system of claim 1, wherein the belt comprises a leading end and a trailing end, wherein the web regions engage the paddle regions proximate a trailing edge of the paddle regions and wherein a trailing edge of the paddle regions is oriented towards the trailing end of the belt.

3. The tube conveyor belt system of claim 1, wherein the paddle regions substantially resist deformation.

4. The tube conveyor belt system of claim 1, wherein the paddle regions have a height that is substantially the same as a height of the web regions.

5. The tube conveyor belt system of claim 1, wherein the paddle regions are in a substantially linear configuration.

6. The tube conveyor belt system of claim 1, wherein the paddle regions and the web regions are each fabricated from a reinforcing material and a cover material that covers at least a portion of the reinforcing material.

7. The tube conveyor belt system of claim 1, wherein when the cleat is positioned in the portion of the support having the concave shape, the paddle regions on opposite sides of one of the web regions do not engage each other and the belt is adjacent the support.

8. The tube conveyor belt system of claim 1, and further comprising a base proximate to where the at least one cleat extends from the at least one surface of the belt, wherein the base has a width that is greater than a width of the at least one cleat and wherein the width is oriented between leading and trailing edges of the at least one cleat.

9. A conveyor belt cleat comprising:
   a plurality of paddle regions in a spaced-apart configuration; and
   a plurality of web regions that have a flexibility that is greater than a flexibility of the paddle regions, wherein one of the web regions is positioned between adjacent paddle regions and wherein the paddle regions have a height that is substantially the same as a height of the web regions.

10. The conveyor belt cleat of claim 9, wherein the paddle regions substantially resist deformation.

11. The conveyor belt cleat of claim 9, wherein the paddle regions are in a substantially linear configuration.

12. The conveyor belt cleat of claim 9, wherein the paddle regions and the web regions are each fabricated from a reinforcing material and a cover material that covers at least a portion of the reinforcing material.

13. A method of using a tube conveyor belt system that includes a support, wherein at least a portion of the support has a concave shape and wherein the method comprises:
   providing a conveyor belt that comprises a belt and at least one cleat, wherein the belt has a surface, wherein the at least one cleat extends from the surface of the belt, wherein the cleat comprises a plurality of paddle regions and a plurality of web regions, wherein the plurality of paddle regions are in a spaced-apart configuration, wherein the web regions have a flexibility that is greater than a flexibility of the paddle regions, wherein one of the web regions is positioned between adjacent paddle regions, wherein the paddle regions have a height that is substantially the same as a height of the web regions and wherein the paddle regions are in a substantially linear configuration; and
   moving the at least one cleat to a curved profile when the at least one cleat is over the portion of the support having the concave shape, wherein when the cleat is in the curved profile, the paddle regions on opposite sides of one of the web regions do not engage each other.

14. The method of claim 13, wherein the belt comprises a leading end and a trailing end, wherein the web regions engage the paddle regions proximate a trailing edge of the paddle regions and wherein a trailing edge of the paddle regions is oriented towards the trailing end of the belt.

15. The method of claim 13, wherein the belt comprises a leading end and a trailing end and wherein the when the belt is in a flat configuration, the web regions have a convex shape that is oriented towards the trailing end.

16. The method of claim 13, wherein the paddle regions substantially resist deformation.

17. The method of claim 13, wherein the paddle regions and the web regions are each fabricated from a reinforcing material and a cover material that covers at least a portion of the reinforcing material.

* * * * *